(12) United States Patent
Kuhlmann et al.

(10) Patent No.: US 7,390,417 B2
(45) Date of Patent: Jun. 24, 2008

(54) PORTABLE ULTRAVIOLET WATER PURIFICATION SYSTEM

(75) Inventors: Kurt Kuhlmann, San Jose, CA (US); John E. Andrews, Cardiff, CA (US)

(73) Assignee: Meridian Design, Inc., San Jose, CA (US)

( * ) Notice: Subject to any disclaimer, the term of this patent is extended or adjusted under 35 U.S.C. 154(b) by 403 days.

(21) Appl. No.: 11/003,536

(22) Filed: Dec. 3, 2004

(65) Prior Publication Data

US 2005/0205480 A1  Sep. 22, 2005

Related U.S. Application Data

(60) Provisional application No. 60/554,665, filed on Mar. 19, 2004.

(51) Int. Cl.
*C02F 1/32* (2006.01)
(52) U.S. Cl. .................... 210/748; 250/432 R
(58) Field of Classification Search .............. 210/143, 210/192, 243, 748; 250/432 R; 422/24, 422/186.3
See application file for complete search history.

(56) References Cited

U.S. PATENT DOCUMENTS

| 4,184,076 | A | | 1/1980 | Kosnoff |
| 4,296,328 | A | | 10/1981 | Regan |
| 4,559,478 | A | * | 12/1985 | Fuller et al. ............. 315/224 |
| 4,912,375 | A | | 3/1990 | Deglon |
| 6,042,720 | A | | 3/2000 | Reber et al. |
| 6,110,424 | A | | 8/2000 | Maiden et al. |
| 6,144,175 | A | | 11/2000 | Parra |
| 6,436,299 | B1 | * | 8/2002 | Baarman et al. ............ 210/748 |
| 6,514,405 | B1 | | 2/2003 | Lifschitz |
| 2002/0131906 | A1 | | 9/2002 | Wismeth |

OTHER PUBLICATIONS

Sterilight—http://www.envirodoc.com/uv-sterilization-water.htm, date unknown.
DLR Water purifier—http://www.americanairandwater.com/water/w_prods.htm, date unknown.
Steri-Pen—http://store.yahoo.com/campingsurvival/stulwapupowa.html, date unknown.

* cited by examiner

*Primary Examiner*—Matthew O. Savage
(74) *Attorney, Agent, or Firm*—Zarian Midgley & Johnson PLLC (57) ABSTRACT

A portable water-purification system includes a container for holding a liquid and an ultraviolet light source configured for immersion in the liquid. The ultraviolet light source is a straight low-cost tube controlled by electronic circuitry for providing hot-cathode striking at a relatively low voltage using a fly-back inductor. The operation of the water purification system is controlled by a micro-controller within the electronic circuitry.

19 Claims, 10 Drawing Sheets

PORTABLE ULTRAVIOLET WATER PURIFICATION SYSTEM

RELATED APPLICATIONS

The present application claims priority to U.S. Provisional Patent Application Ser. No. 60/554,665, filed Mar. 19, 2004.

BACKGROUND OF THE INVENTION

1. Field of the Invention

The invention relates generally to devices and methods for disinfecting water and, more particularly, to a portable, low-cost system for disinfecting water using ultraviolet light.

2. Description of the Related Art

Every day, an estimated 3,000 to 6,000 die worldwide due to infections from waterborne bacteria. Death typically results from acute dehydration, malnutrition, or other related complications. The majority of victims are young children and older people that live in economically impoverished countries. In these regions, contaminated surface water sources and poorly functioning municipal water distribution systems lead to the transmission of waterborne bacterial diseases. Although the problem is particularly bad in impoverished countries, population groups in developed countries, such as residents in remote rural areas of the United States with poor water treatment and delivery systems, are also at risk. In addition, campers and hikers who do not have access to treated water also commonly fall victim to waterborne bacterial infections.

Conventional centralized water treatment and distribution systems can be very expensive and take years to complete. Furthermore, it is often impractical to provide centralized water treatment in sparsely populated areas. Therefore, to provide the at risk groups with potable water requires innovative practical solutions such as, for example, point-of-use disinfection. In one disinfection method, ultraviolet ("UV") radiation having wavelengths in the range of 200 to 300 nm may be used to kill disease-carrying microorganisms in water. UV radiation has been found to deactivate a broad spectrum of pathogenic contaminates from amoebic sized microorganisms to bacteria, algae and viruses. Water purification by ultraviolet radiation provides numerous advantages over other currently available water treatment methods. For example, UV water purification systems do not require chemicals nor do they require expensive filters.

Existing UV water purification systems are often large installed flow-through systems serving a large number of people. However, in recent years, a number of smaller portable UV water purification systems have become available for use by individuals. Portable UV water purification systems use fluorescent tubes for emitting UV light into the water. A quartz cover is typically provided around the fluorescent tube to protect the light source from mechanical shock and to electrically insulate the light source from the water being disinfected. Quartz covers are commonly used because it has been found that quartz is transparent at germicidal UV wavelengths, such as, around 254 nm. However, quartz covers are very expensive and thereby substantially increase the manufacturing cost.

Existing UV water purification systems also include electronic circuitry for driving the fluorescent tube. The circuitry is typically configured to drive the fluorescent tube using a "cold-cathode" striking method. In this method, a high voltage (e.g., 400-500V RMS) is applied to the anode and cathode terminals of the fluorescent tube. The voltage must be high enough to produce ionization with the anode and cathode terminals at room temperature (i.e., hence "cold-cathode"). In one common cold-cathode striking method, an H-bridge driven, capacitively tuned, step up transformer circuit is used to drive the fluorescent tube with an AC power input. Unfortunately, this type of electronic circuitry is expensive to manufacture, thereby driving up manufacturing costs and making the system prohibitively expensive for many applications. As a result, UV water purification systems and, more particularly, portable UV systems have not met with great commercial success.

Due to the complexity and high costs associated with existing UV water purification systems, an urgent need exists for an improved water purification system that requires fewer components and is easily affordable to large segments of the population. It is desirable that such a system be rugged in construction and easily transportable for disinfecting drinking water in regions wherein water purification is not available. It is also desirable that such a device be lightweight, compact and easy to use. The present invention addresses these needs.

SUMMARY OF THE INVENTION

Preferred embodiments of the present invention provide an improved portable UV water purification system. In one preferred embodiment, the container has a capacity of about one liter and is configured to be easily transported and protects the UV tube from damage. Preferably, the container is further configured such that a user may drink directly from the container.

The water purification system is preferably provided with a power source, such as batteries, and electronic circuitry for controlling the radiation of UV light. A top housing may be removed to fill the container and then replaced for running a sterilization cycle. The housing may also be used to contain the power source and electronic circuitry. Other embodiments allow the user to fill the container through a resealable opening provided along the top end, such that it is not necessary to remove the housing. The electronic circuitry for driving the UV source preferably incorporates one or more of the following features in order to reduce cost: a fly-back inductor, hot-cathode striking, a uni-directional pulsed tube current, and high-frequency pulse repetition rate (e.g., approximately 50 kHz). UV tubes, which electrically are substantially identical to fluorescent tubes, are typically driven with an electronic ballast that uses a transformer, resonant tuning capacitors, and an H-bridge comprising 4 MOSFETs. By using an inductor to increase the voltage with just one MOSFET and no caps, the system cost is substantially reduced. A straight UV tube may be used without a quartz cover to further reduce costs.

In one preferred embodiment, a portable water purification system comprises a container having an opening and defining an interior volume suitable for holding a liquid. An ultraviolet light source is configured to extend at least partially into the interior volume of the container. A fly-back inductor is electrically coupled to a power supply for driving the ultraviolet light source with a sufficiently high voltage to ionize the vapor in the light source.

In one variation, a cathode end of the ultraviolet light source is grounded and the fly-back inductor provides a pulsed voltage to an anode end of the ultraviolet light source. The cathode end of the ultraviolet light source may be electrically coupled to a liquid held within in the container for providing the ground. The voltage from the fly-back inductor preferably has a pulse rate of 50 kHz or greater and a peak voltage is about 80 V. The electrical current through the ultraviolet light source is preferably uni-directional. In another variation, the portable water purification system further comprises a removable top portion for covering the opening. The ultraviolet light source is preferably coupled to the removable top portion.

In another preferred embodiment, a portable water purification system comprises a container having an opening and defining an interior volume suitable for holding a liquid. An ultraviolet light source is configured to extend into the interior volume such that at least a portion of the light source is immersed in the liquid. The ultraviolet light source has a cathode end and an anode end with the cathode end of the ultraviolet light source being grounded. An inductor is electrically coupled to the anode end of the ultraviolet light source and a field-effect transistor. The field-effect transistor controls an electrical current through the inductor. The inductor and the field-effect transistor cooperate to provide a pulsed voltage to the anode end of the ultraviolet light source for emitting ultraviolet radiation.

In one variation, a micro-controller is operatively connected to the field-effect transistor for controlling the frequency of the pulsed voltage. The functionality of the micro-controller may be implemented in software. In another variation, a ground pin is electrically coupled to the cathode end of the light source. The ground pin extends into the interior volume such that the liquid is used to ground the cathode end when the liquid is in contact with the ground pin. In yet another variation, a switch is provided for applying the pulsed voltage to the cathode end for a fixed duration before applying the pulsed voltage exclusively to the anode end. The initial application of the pulsed voltage to the cathode end provides the system with hot-cathode striking during use.

In another embodiment, a method of disinfecting water includes providing a container having an interior volume suitable for holding a liquid wherein the container has an opening. An ultraviolet light source is inserted through the opening and into the liquid. A high frequency series of voltage pulses is applied to the ultraviolet light source for ionizing vapor in the light source and emitting ultraviolet radiation using a uni-directional current.

In one variation of this method, an inductor and a field-effect transistor cooperate to form a fly-back inductor for applying the voltage pulses to the ultraviolet light source. In another variation, a micro-controller is operatively coupled to the field-effect transistor for controlling the frequency of the voltage pulses. In another variation, the micro-controller starts and stops the voltage pulses to provide a disinfection cycle. In another variation, the method further comprises sensing that the liquid is above a predetermined level before applying the voltage pulses to the ultraviolet light source. This feature prevents the system from operating when the container is not full of a liquid. In still another variation, the ultraviolet light source comprises a substantially straight tube.

DETAILED DESCRIPTION OF THE PREFERRED EMBODIMENTS

Preferred embodiments of the present invention described herein provide an improved portable water purification system which uses UV light for killing disease-carrying microorganisms in water. The water purification system may be used to remove contaminants from dangerous water supplies in locations wherein water purification is not readily available. In one application, the water purification system may be used by residents living in remote or impoverished regions to treat contaminated water. In another application, campers or hikers may use the water purification system to disinfect water from lakes or streams before drinking. Still further, the water purification system may be used to disinfect water around the house during emergencies, such as an earthquake or flood, wherein the tap water has become contaminated.

Figure 1:
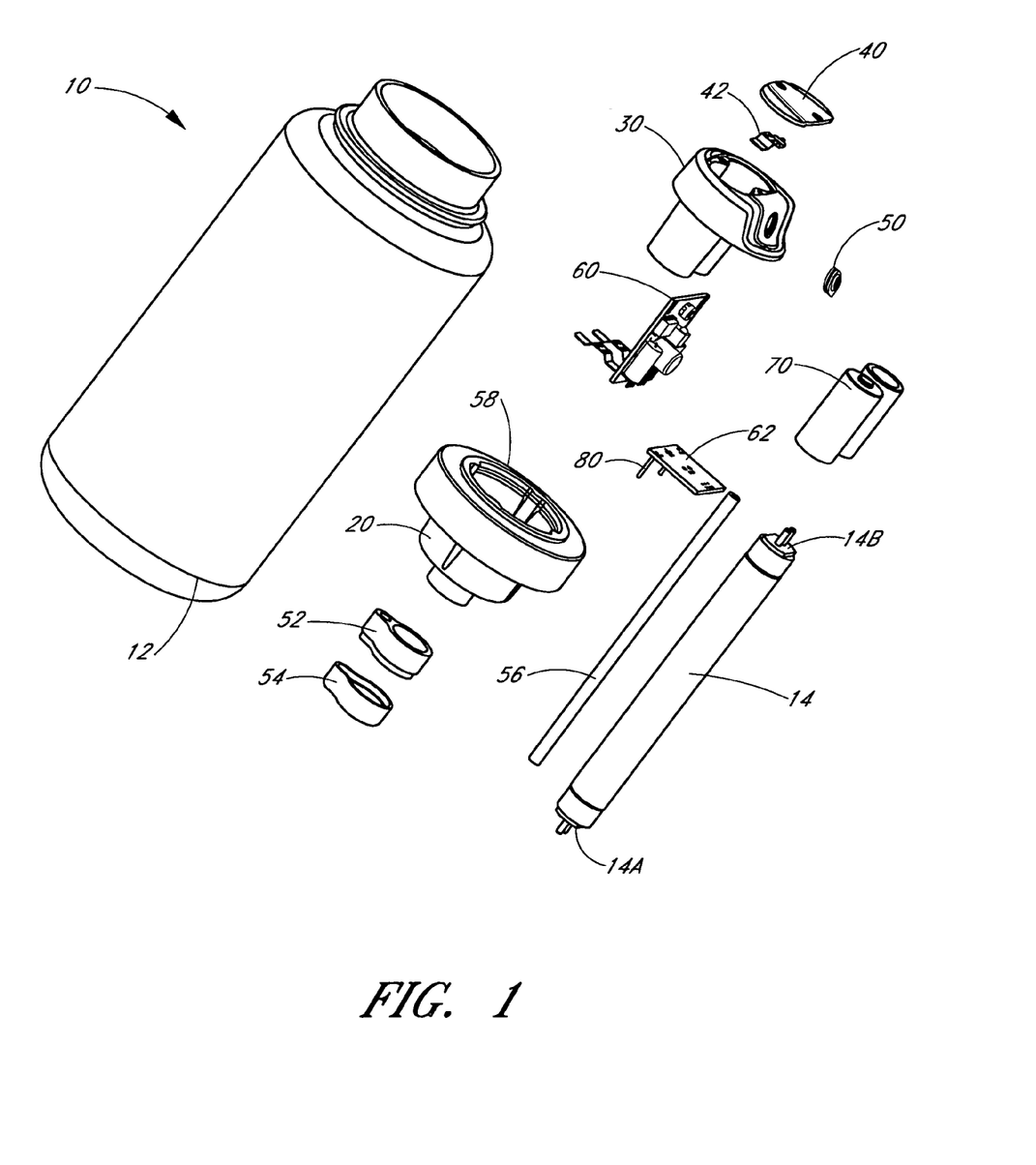
FIG. 1 is an exploded view illustrating the components of a portable UV water purification system according to one preferred embodiment.

With reference now to the exploded view FIG. 1, for purposes of illustration, one preferred embodiment of a water purification system 10 includes, generally, a container 12, a UV light source 14, a control unit 60 and a power supply 70. In one preferred feature, the water purification system 10 is constructed such that the UV light source 14 does not require a quartz cover, thereby substantially reducing the cost of manufacture. Rather than using a quartz cover, the container 12 which holds the water is configured to provide mechanical protection against damage to the UV light source. The container may be provided as a low cost injection molded body for additional cost savings. The container is preferably made of a substantially opaque material which prevents UV light from passing through the container wall, thereby preventing user exposure to potentially harmful radiation. In one variation, an inner surface of the container may be formed with a reflective surface.

The UV light source 14 is preferably provided as a straight fluorescent tube configured to extend at least partially into the container 12 for immersion in the water. A straight tube is preferably used, rather than a more expensive "U-shaped" tube, for additional cost savings. In the illustrated embodiment, an insulating molded bulb cap 52 is provided for placement over the anode end 14A of the UV light source. The cap 52 is covered by a molded bulb cap lid 54. The cap 52 and lid 54 are configured to receive a wire sleeve 56 which carries electrical power from the control unit 60 to the anode end 14A of the UV light source 14. The cap and lid insulate the anode end of the UV light source 14 and the wire sleeve 24 from the liquid. The cap and lid also prevent electrolysis from eroding the contact on the anode end of the UV light source.

The UV light source 14 has a grounded cathode end 14B that is electrically coupled to the control unit 60. The control unit 60 is contained within a top cap lid 20, which is coupled to a battery housing 30. The top cap lid 20 and battery housing 30 form a removable top portion which is placed over the opening on the top end of the container 12. A threaded member 58 is preferably attached to the top cap lid 20 for securing the removable top portion to the container 12. In the illustrated embodiment, the top cap lid 20 and the battery housing 30 define a fully enclosed volume for housing the control unit 60 and related components. However, a variety of other assemblies may be used without departing from the scope of the invention.

Figure 2A:
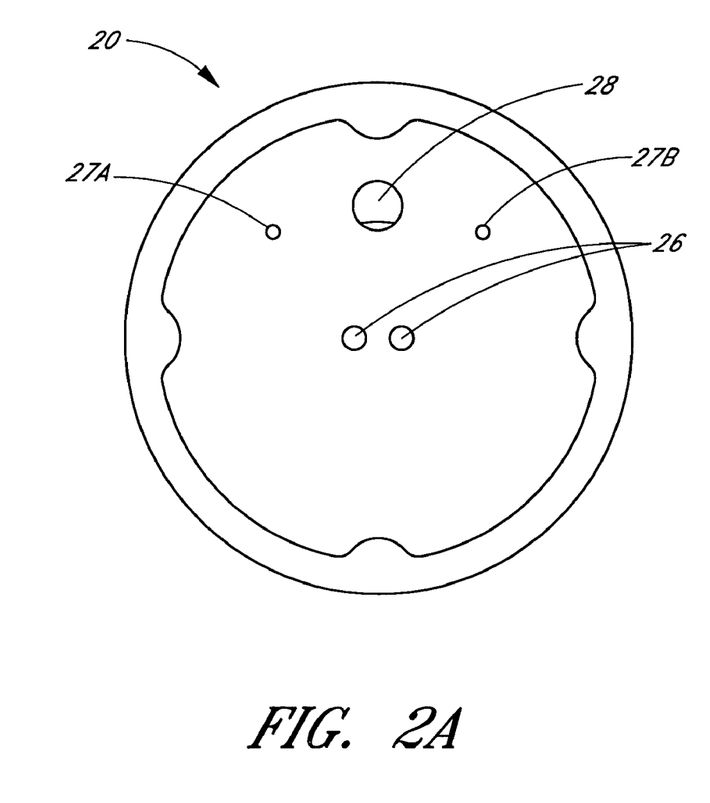
FIGS. 2A through 2F illustrate various views of a top cap lid configured for attachment to the top end of the container as shown in FIG. 1.
Figure 2B:
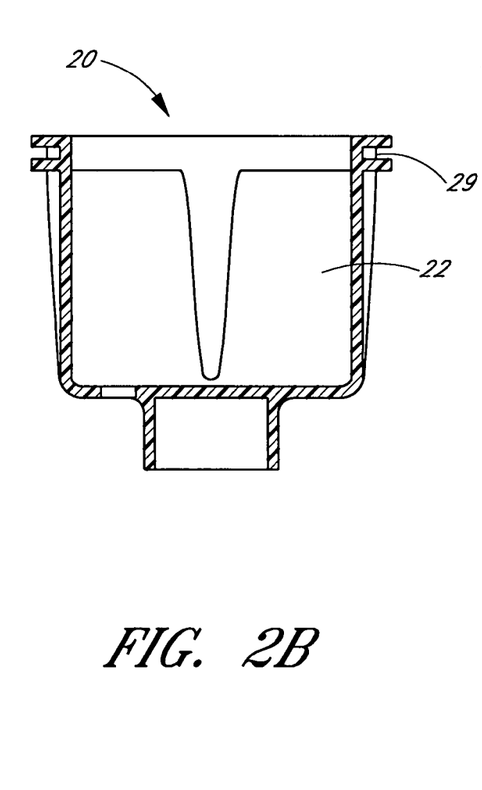
Figures 2C, 2D:
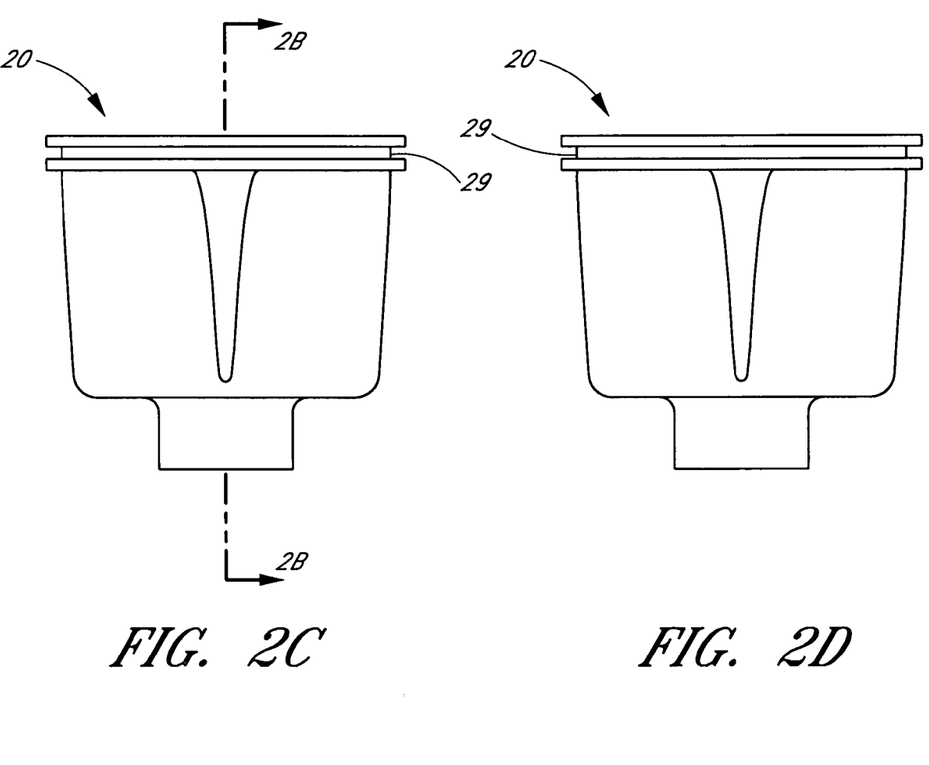
Figure 2E:
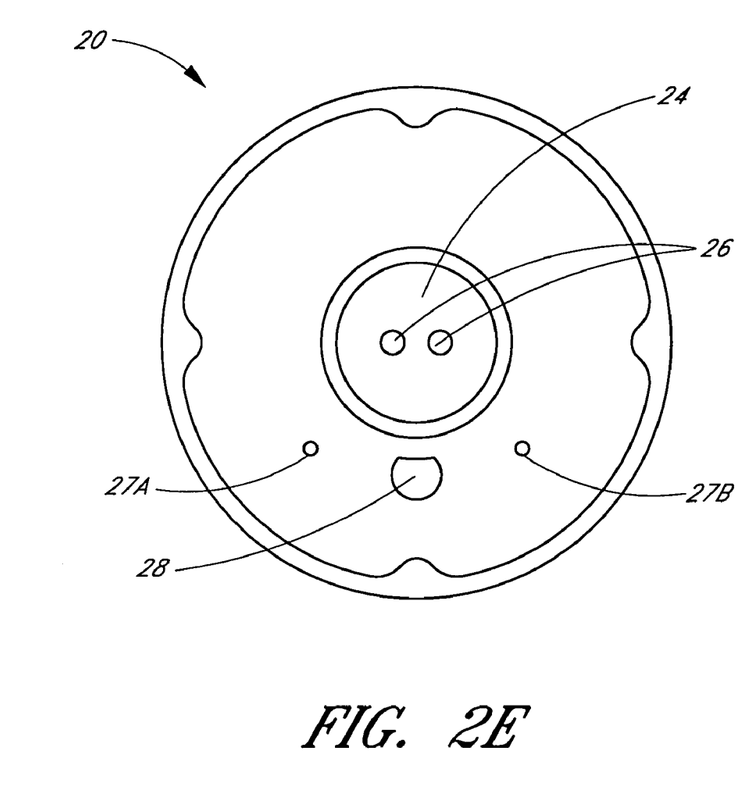
Figure 2F:
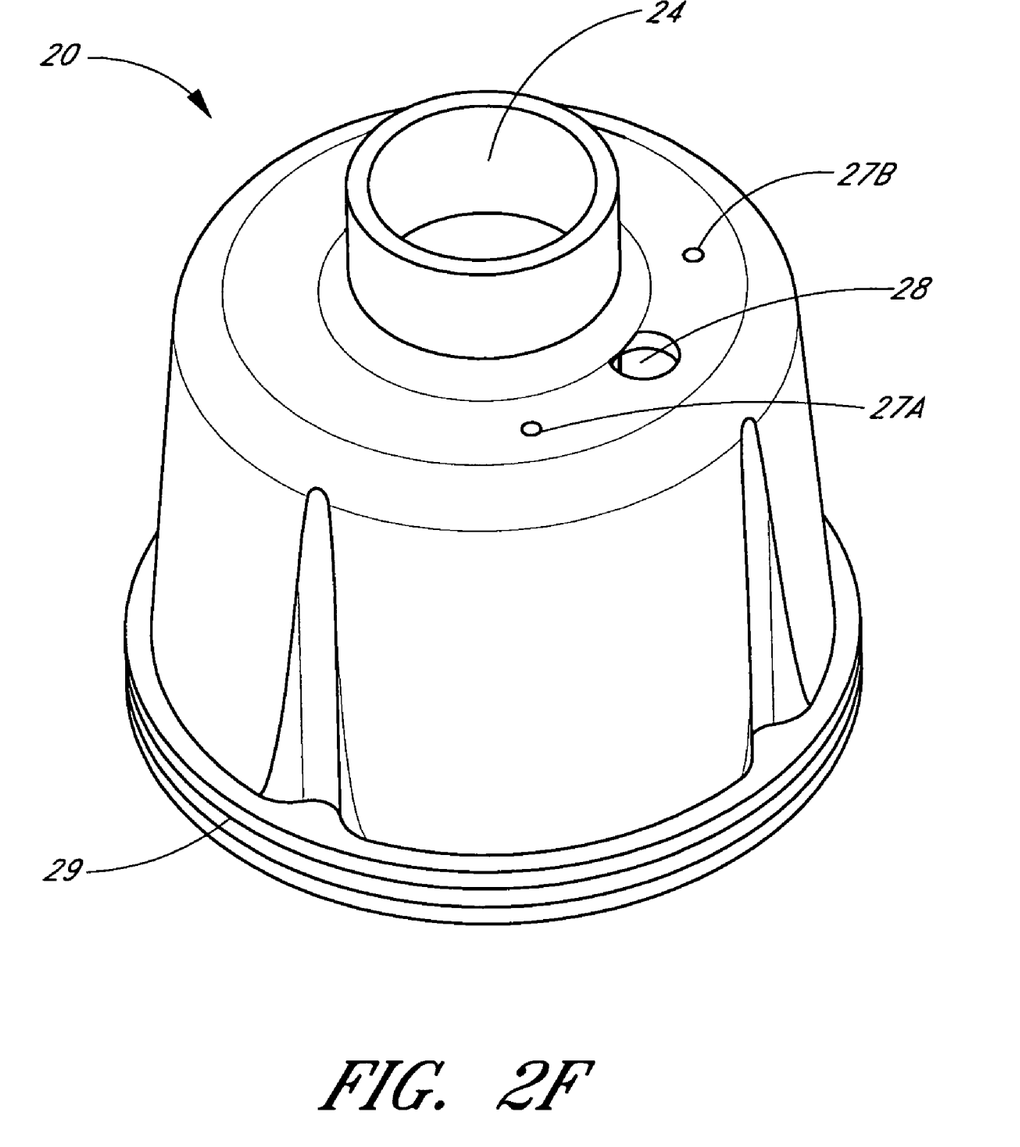

With reference now to FIGS. 2A through 2F, various views of the top cap lid 20 are provided. In preferred embodiments, the top cap lid is made of a molded plastic material. FIG. 2A is a top view looking downward into the top cap lid 20. FIG. 2B is a side cross-sectional view wherein it can be seen that the top cap lid defines an interior volume 22 for housing the components of the control unit. FIGS. 2C and 2D are first and second side views of the top cap lid. FIG. 2E is a bottom view wherein it can be seen that the bottom end is provided with a recess 24 sized for receiving the cathode end of the UV light source. Two holes 26 are formed in the bottom end of the top cap lid for receiving the contacts on the cathode end of the UV light source. The holes allow the contacts to extend through the bottom of the top cap lid to the control unit. A large side hole 28 is provided for allowing the wire sleeve to extend through the bottom of the top cap lip for providing power to the anode end of the UV light source. Two smaller side holes 27A, 27B may be provided for allowing pins to extend through the top cap lid into the liquid. In one preferred embodiment, a ground pin extends through hole 27A and a water sensor pin extends through hole 27B. FIG. 2F is a perspective view of the top cap lid. It can be seen that a lip portion 29 is provided around a top rim of the top cap lid for engagement with the threaded member.

Figure 3A:
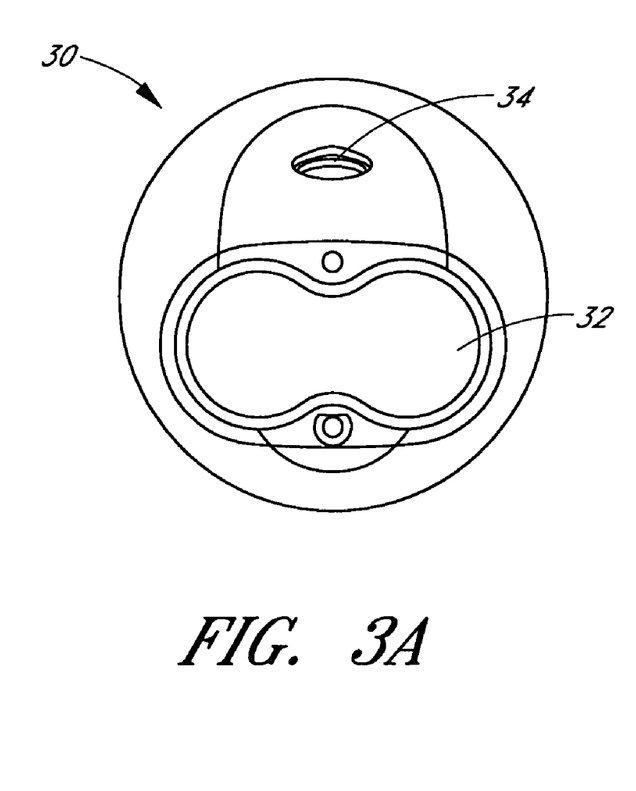
FIGS. 3A through 3F illustrate various views of a battery housing for attachment to the top cap lid.
Figure 3B:
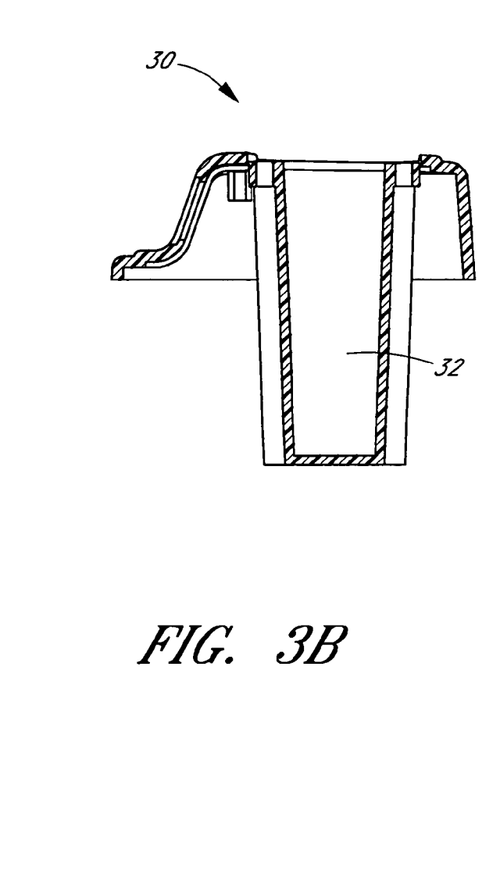
Figure 3C:
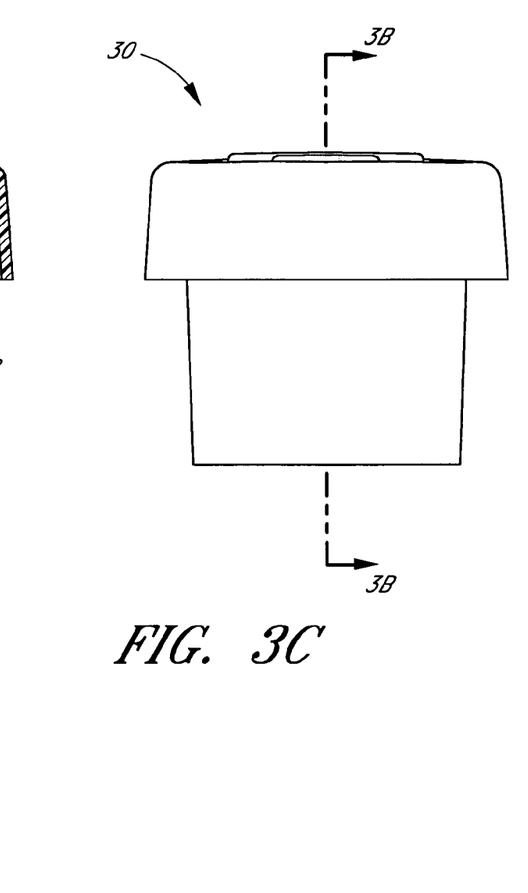
Figure 3D:
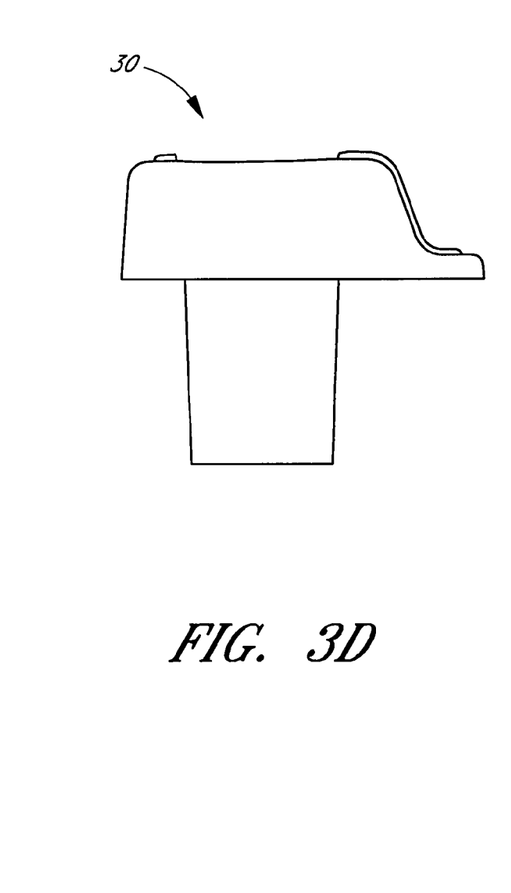
Figure 3E:
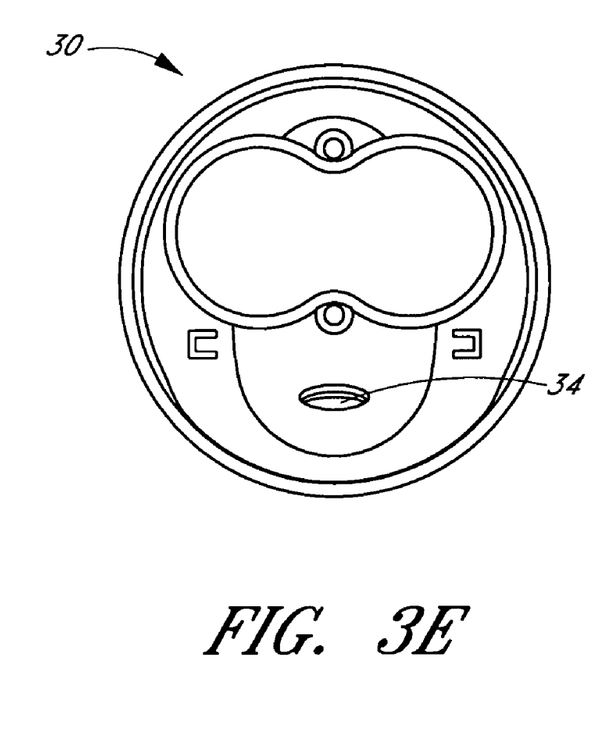
Figure 3F:
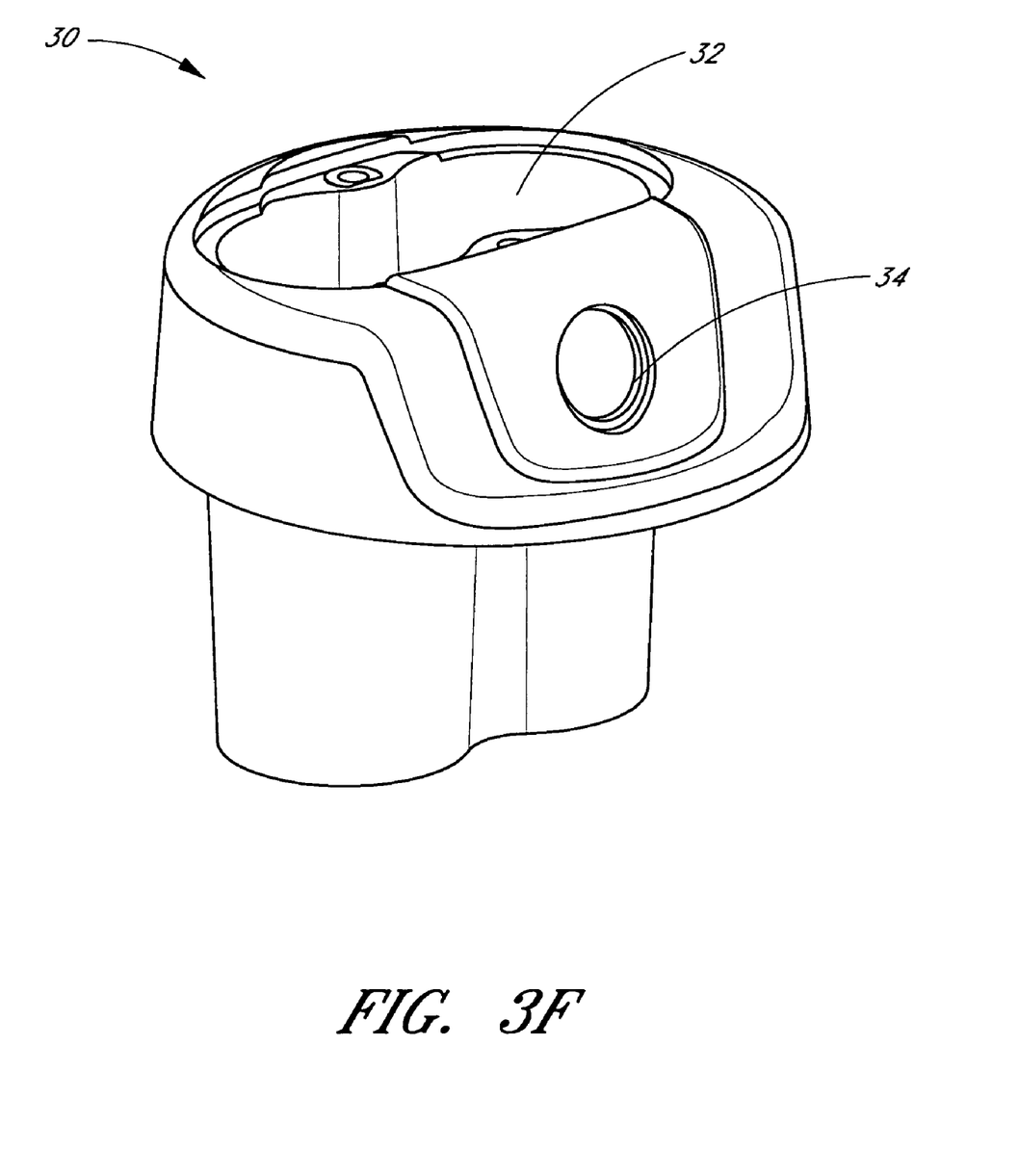

With reference now to FIGS. 3A through 3F, various views of the battery housing 30 are provided. FIG. 3A is a top view of the battery housing. It can be seen that the battery housing defines an interior chamber 32 sized for receiving two AA batteries. FIG. 3B is a side cross-sectional view of the battery housing. FIGS. 3C and 3D are first and second side views and FIG. 3E is a bottom view of the battery housing. FIG. 3F is a perspective view of the battery housing which further illustrates the chamber 32 for receiving the batteries. In addition, it can be seen that a hole 34 extends through the front face of the battery housing for receiving a mechanical button that may be used to control the operation of the water purification system.

Figure 4:
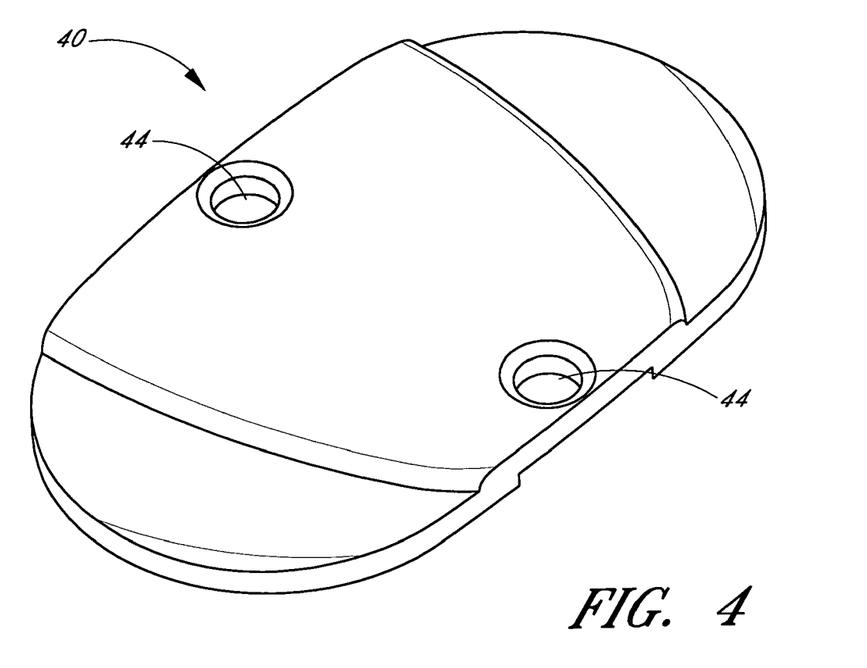
FIG. 4 is a perspective view illustrating a battery cover for attachment to a top end of the battery housing.
Figure 5:
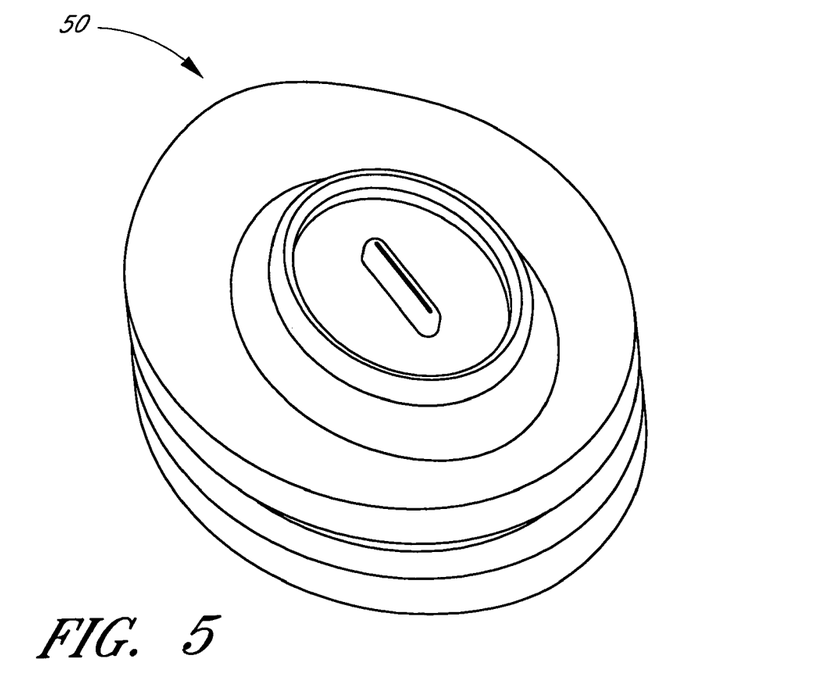
FIG. 5 is an enlarged perspective view illustrating a molded button disposed on a front end of the battery housing.

With reference now to FIG. 4, a perspective view of a battery cover 40 is provided. A first battery terminal (see element 42 of FIG. 1) is preferably disposed along an inner surface of the battery cover 34. The battery cover 40 is preferably configured with first and second holes 44 adapted for receiving mechanical fasteners, such as threaded screws, for securing the battery cover to the top end of the battery housing. With reference to FIG. 5, an enlarged view of one preferred molded button 50 for placement on the front end of the top cap lid is illustrated. The button is configured to be received within hole 34 shown in FIG. 3F.

Figure 6:
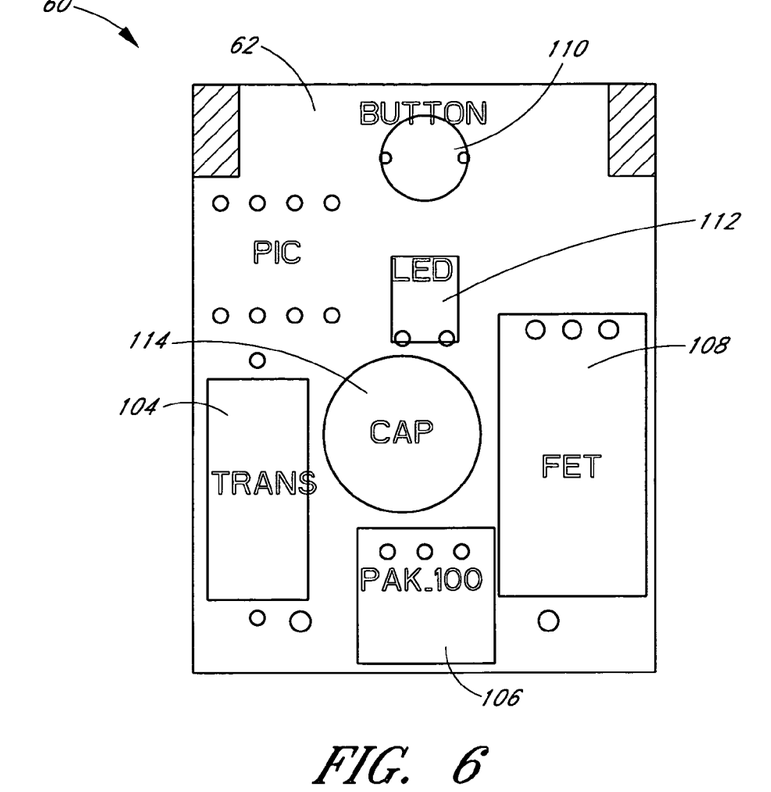
FIG. 6 is an enlarged view of a first circuit board containing electronic circuitry for driving the UV light source.
Figure 7:
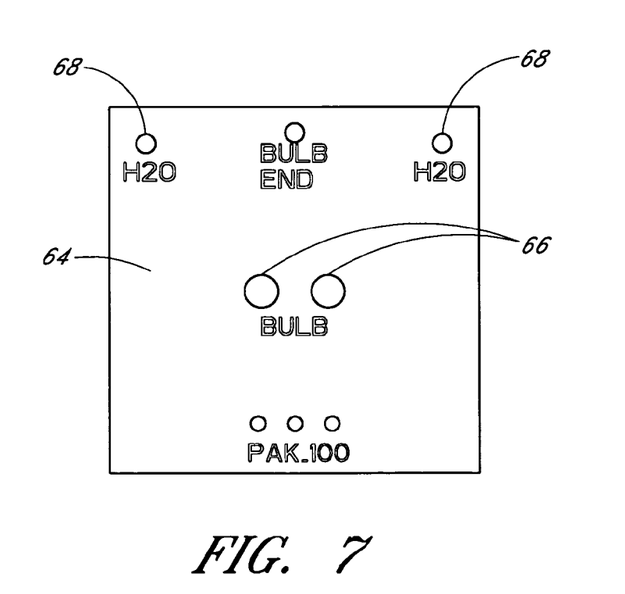
FIG. 7 is an enlarged view of a second circuit board for coupling to the UV light source.

With reference now to FIG. 6, various components of the control unit 60 are disposed on a first circuit board 62. The components on the first circuit board include, generally, an inductor 104, a micro-controller 106, a field effect transistor 108, a switch 110 and an LED 112. With reference to FIG. 7, a second circuit board 64 is illustrated which is operatively connected to the first circuit board. The second circuit board is configured with two holes 66 for receiving the contacts on the cathode end of the UV light source. The second circuit board also includes holes 68 for connection to a ground pin and/or a water sensor pin, as will be described in more detail below. Although the control unit, including first and second circuit boards, is illustrated in FIG. 1 as being located along the top end of the container, it will be appreciated that some or all of the components may be located in another location, such as along the bottom end portion of the container, without departing from the scope of the invention.

Figure 8:
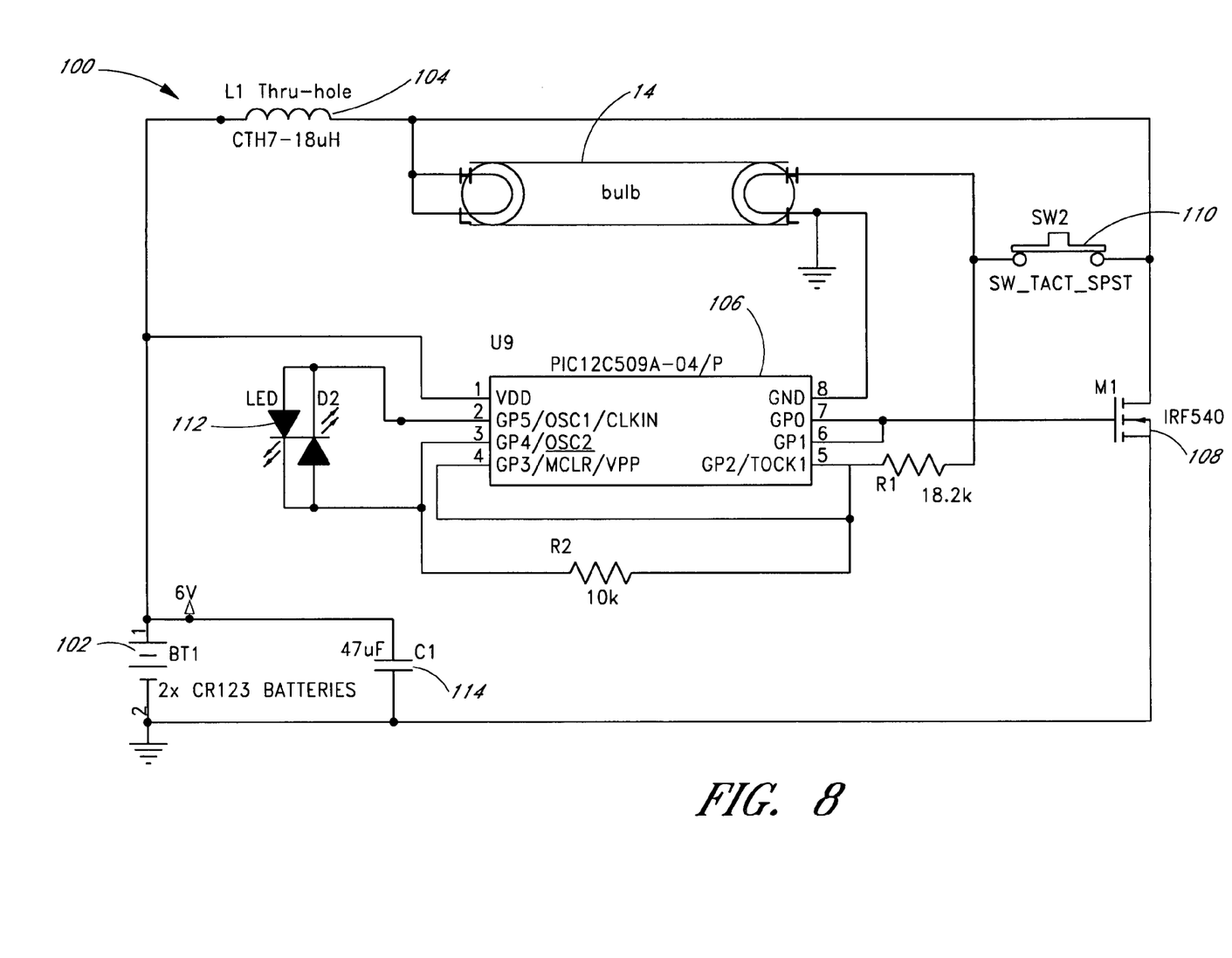
FIG. 8 is a schematic diagram illustrating a preferred circuit for driving the UV light source.

With reference now to FIG. 8, the electronic circuit 100 provided by the control unit for driving the UV light source 14 is schematically illustrated. The circuit is configured for grounding the cathode end of the UV light source while providing a sufficient voltage to the anode end for ionizing the vapor. The circuit 100 preferably includes, generally, a power supply 102, the inductor 104, the micro-controller 106, the field-effect transistor 108, and the switch 110. The power supply is preferably provided by a pair of batteries, such as two CR123 Lithium batteries, to provide a 6VDC power source. In one important feature, the circuit preferably provides a fly-back inductor for generating a sufficiently high voltage to drive the UV light source 14. A fly-back inductor is very efficient and wastes very little power as heat, thereby providing an advantage over existing schemes utilizing less efficient and more expensive H-bridge circuits. Using the fly-back inductor, the relatively low voltage input from the power supply 102 is transformed to a much higher voltage that is capable of ionizing the vapor in the UV light source. More particularly, the fly-back inductor operates by storing energy in the inductor 104 during the power switch "on time" and transferring this energy to the output during the "off-time" in the form of a high voltage pulse, which is applied to the fluorescent tube.

With continued reference to FIG. 8, in another advantageous feature, the fly-back inductor is capable of driving the UV light source with a uni-directional pulsed tube current, rather than an AC input. To provide substantially continuous luminescence, the pulsed tube current input has a high-frequency pulse repetition rate. For example, in one preferred embodiment, the voltage has a pulse repetition rate of approximately 50 kHz or more. However, a wide range of pulse repetition rates may be used without departing from the scope of the invention. It will be appreciated by those skilled in the art that a circuit incorporating a fly-back inductor is capable of controlling and powering the UV light source with fewer and much less expensive components by utilizing a uni-directional pulsed tube current.

In yet another advantageous feature, the circuit 100 is capable of driving the UV bulb using a hot-cathode striking method. To provide hot-cathode striking, the voltage output from the fly-back inductor is used to preheat the cathode end and bulb filament before use. In one preferred embodiment, the voltage output is primarily dissipated through a heating filament on the cathode end when the switch 110 is initially depressed by the user. The produced heat effectively frees electrons from the cathode end of the UV light source. After the switch 110 is released by the user, the voltage pulses are directed exclusively to the anode end of the UV light source. Accordingly, it will be appreciated that the fly-back inductor is advantageously configured for a dual purpose such that the benefits of hot-cathode striking may be realized at little or no additional cost. Those skilled in the art will further appreciate that the use of hot-cathode striking allows for a reduction in the voltage necessary for ionization, thereby further reducing costs and increasing efficiency. For example, in preferred embodiments, the voltage necessary to ionize the mercury vapor is only about 80V peak. The reduction in voltage, along with the high repetition of pulses, allows for a reduction in size of the induction coil. The reduction in size also corresponds to a substantial reduction in cost and a safer design since electronic ballast based designs typically need to generate upwards of 400V to strike the tube.

In addition to the reduction in voltage, use of a hot-cathode striking method provides other advantages over devices using cold-cathode striking. For example, hot-cathode striking does not require a mechanism, such as a glow switch starter, to preheat the electrodes and the bulb filament before use. In another benefit, hot-cathode striking allows the UV bulb to turn on very quickly, thereby reducing the time of a disinfection cycle. In yet another benefit, the relatively low input voltage requirement substantially reduces power consumption. This is a particularly advantageous feature when the portable system is powered by batteries having a limited life.

With continued reference to FIG. 8, the operation of the circuit 100 will now be described during use for disinfecting water using the UV water purification system. Before use, the circuit is initially in "off" condition such that the circuit is open and no current flows through the inductor 104. After the container is filled with water or another liquid, the user actuates the switch 110 to begin a sterilization cycle. Switch 110 is mechanically coupled to the button (see element 50 of FIG. 5) disposed along the front end of the battery housing (see element 30 of FIG. 1). A single pole push button switch is preferably used for reducing system cost After the switch 110 is depressed, the micro-controller 106 wakes from a low power mode and begins operating the fly-back inductor. Control of the fly-back inductor is implemented in software within the micro-controller 106. Initially, the software within the micro-controller applies a voltage to (i.e., switches on) the control field-effect transistor 108, thereby closing the circuit such that a current flows from the power supply (e.g., batteries) and through the inductor 104 to ground. The field-effect transistor 108 advantageously requires very little power for operation, thereby helping to prolong the useful life of the power supply. The current is preferably allowed to flow through the inductor 104 for approximately 20 μs. However, in one preferred variation, the software can dynamically measure the current during use and adapt the drive time of the transistor 108 to achieve a particular desired current. At the end of the predetermined period (e.g., 20 μs), the software turns off the voltage input to the transistor 108, thereby interrupting the current and opening the circuit. The interruption of the current causes the field of the inductor 104 to produce a short-duration high-voltage pulse that is transmitted to the anode end of the UV light source. Due to the use of hot-striking, the pulse produced by the inductor need only be in the general range of about 80V to ionize the mercury vapor in the UV tube, thereby causing the UV light source to emit UV radiation.

The micro-controller 106 turns the voltage to the field-effect transistor 108 on and off such that pulses are repeatedly produced. As a result, the circuit 100 provides a high frequency (e.g., 50 kHz) series of voltage pulses that continuously power the UV light source during the disinfection cycle. In one example, a disinfection cycle may have a period of 60 seconds. In a preferred embodiment, the high frequency series of voltages pulses are applied to the anode end of the UV light source for powering the light source with a uni-directional current. This configuration allows for the use of a straight UV bulb which simplifies operation and reduces manufacturing costs.

In one variation, the micro-controller 106 is preferably configured to detect when the tube has been struck (i.e., confirm the light source is emitting UV radiation) by monitoring the voltage of the cathode terminal for spikes synchronous with the high voltage pulses. In another variation, the micro-controller 106 may be configured to shut down the fly-back inductor if the voltage pulses are not detected. Shutting down is desirable when pulses are not detected since no low impedance path exists for the power supply. The shutdown feature prevents the energy from being dissipated in an avalanche breakdown of the transistor 108. Similarly, if the tube is not struck, or starts but later stops, the micro-controller 106 may be configured to detect this and shut down the fly-back power supply.

In yet another variation, one or more light-emitting diodes (LED's) 112 or other indicators may be included in the circuit 100 to provide visual feedback to the user during operation. In one preferred embodiment, a visual indicator is illuminated at the completion of the sterilization cycle to indicate whether the cycle was successful. For example, if the tube and circuit are operating correctly, the cycle proceeds for a pre-selected period of time that is sufficient to be germicidal for clear liquids in the amount contained. Upon successful completion of the sterilization cycle, a green LED may be illuminated. If the sterilization cycle failed to complete for some reason, a red LED may be illuminated to alert the user that the water is not safe to drink. During use, if the user desires to terminate the cycle for any reason, the switch 110 may be pressed again during operation of the UV source. This will cause the sterilization cycle to terminate.

It will be appreciated that, using preferred embodiments of the present invention, the UV light source may be powered using only a single transistor 108 and a single inductor 104. Accordingly, the circuit 100 provides a substantial advantage over H-bridge circuit wherein numerous (e.g., four) transistors are necessary to provide a traditional and a more costly transformer. Still further, it will be appreciated that a high voltage output tuning capacitor is not required using preferred circuitry of the present invention, which further simplifies the circuit and reduces costs.

With reference again to FIG. 1, in yet another preferred variation, one or more electrically grounded pins 80 are provided for detecting the level of the water in the container. In a preferred configuration, the pins 80 are in contact with the water being sterilized only when the water level is high enough to completely immerse the UV tube. The primary purpose of the pins 80 is to help prevent unnecessary exposure to UV radiation. Furthermore, by using carefully selected values for the inductor 104 and a capacitor 114, the fly-back inductor is only capable of striking the UV light source when the return ground path for the high voltage anode pulses is enhanced by the presence of an electrically grounded liquid around the UV light source. This provides an additional level of safety which helps prevent striking the tube when the tube is not completely immersed. More particularly, when the water level is insufficient, the container does not provide contact with the grounded pins 80. In another variation, one or more pins may provide a temperature sensor. In this embodiment, the micro-controller may adjust the period of the disinfection cycle according to water temperature.

The UV water purification system provides an efficient and easy to use device for treating and transporting water. The system has a rugged construction and is small and lightweight such that the system may be easily carried to a remote location, such as during hiking or camping. The system may be manufactured at a low cost, thereby making the system affordable to persons living in impoverished areas that lack access to adequate water treatment facilities.

For enhanced disinfection of the water, one or more filters may be provided along a top opening of the container for filtering out a variety of microbes while filling the container. The filter may take a variety of forms, such as, for example, a fine fabric or a metal screen. Although preferred embodiment are described herein as using batteries to provide a power supply, a variety of alternative power sources may be used. For example, a human powered generator may be incorporated into the device or may be provided as an option that may be attachable to the device. In another alternative embodiment, a solar powered generator (e.g., photo-voltaic cells) may be used to provide a power source. These alternative power sources may be used alone or in combination with batteries. The human powered generator and the solar powered generator each has the advantage of providing a renewable power source that can be used anywhere.

While the foregoing detailed description has described several embodiments of the apparatus and methods of the present invention, it is to be understood that the above description is illustrative only and not limiting of the disclosed invention. It will be appreciated that the specific components can differ from those described above, and that the methods described can be used with a wide variety of systems, while remaining within the scope of the present invention.

What is claimed is:

1. A portable water purification system, comprising:
   a container having an opening and defining an interior volume suitable for holding a liquid,
   an ultraviolet light source configured to extend at least partially into the interior volume;
   a power supply;
   a fly-back inductor electrically coupled to the power supply and the ultraviolet light source, wherein a cathode end of the ultraviolet light source is grounded and the fly-back inductor provides a pulsed voltage to an anode end of the ultraviolet light source; and
   a ground pin electrically coupled to the cathode end of the ultraviolet light source, the ground pin extending at least partially into the interior volume such that liquid in the container is used to ground the cathode end.

2. The portable water purification system of claim 1, wherein the pulsed voltage has a pulse rate of 50 kHz or greater.

3. The portable water purification system of claim 1, wherein an electrical current through the ultraviolet light source is uni-directional.

4. The portable water purification system of claim 1, wherein a peak voltage output from the fly-back inductor is about 80 V.

5. The portable water purification system of claim 1, further comprising a removable top portion for covering the opening.

6. The portable water purification system of claim 5, wherein the ultraviolet light source is coupled to the removable top portion.

7. The portable water purification system of claim 1, wherein the power supply comprises one or more batteries.

8. The portable water purification system of claim 1, further comprising a water sensor pin configured to detect the level of the liquid in the container.

9. The portable water purification system of claim 1, further comprising a temperature sensor configured to detect the temperature of the liquid in the container.

10. A portable water purification system, comprising:
    a container having an opening and defining an interior volume suitable for holding a liquid,
    an ultraviolet light source configured to extend at least partially into the interior volume for immersion in the liquid, the ultraviolet light source having a cathode end and an anode end, the cathode end of the ultraviolet light source being grounded;
    an inductor electrically coupled to the anode end of the ultraviolet light source;
    a field-effect transistor for controlling an electrical current through the inductor, wherein the inductor and field-effect transistor cooperate to provide a pulsed voltage to the anode end of the ultraviolet light source for emitting ultraviolet radiation; and
    a micro-controller operatively connected to the field-effect transistor for controlling the frequency of the pulsed voltage.

11. The portable water purification system of claim 10, further comprising a ground pin extending into the interior volume to ground the cathode end of the ultraviolet light source when the liquid is in contact with the ground pin.

12. The portable water purification system of claim 10, further comprising a switch for applying the pulsed voltage to the cathode end for a fixed duration before applying the pulsed voltage exclusively to the anode end.

13. The portable water purification system of claim 10, wherein the container is made of a substantially opaque material.

14. The portable water purification system of claim 10, wherein an inner surface of the container is formed with a reflective surface.

15. A method of disinfecting water, comprising:
    providing a container having an interior volume suitable for holding a liquid, the container having an opening;
    inserting an ultraviolet light source through the opening and into the liquid; and
    applying a high frequency series of voltage pulses to the ultraviolet light source for ionizing vapor in the light source and emitting ultraviolet radiation using a uni-directional current,
    wherein an inductor and a field-effect transistor cooperate to form a fly-back inductor for applying the voltage pulses to the ultraviolet light source, and
    wherein a micro-controller is operatively coupled to the field-effect transistor for controlling the frequency of the voltage pulses.

16. The method of claim 15, wherein the micro-controller starts and stops a series of voltage pulses to provide a disinfection cycle.

17. The method of claim 15, further comprising sensing that a level of the liquid is above a predetermined level before applying the voltage pulses to the ultraviolet light source.

18. The method of claim 15, wherein the ultraviolet light source comprises a substantially straight tube.

19. The method of claim 15, further comprising applying the voltage pulses to a cathode end of the ultraviolet light source for a fixed duration before applying the voltage pulses exclusively to an anode end of the ultraviolet light source.

* * * * *